H. E. EGGERTH.
WINDMILL FAN.
APPLICATION FILED JAN. 12, 1920.

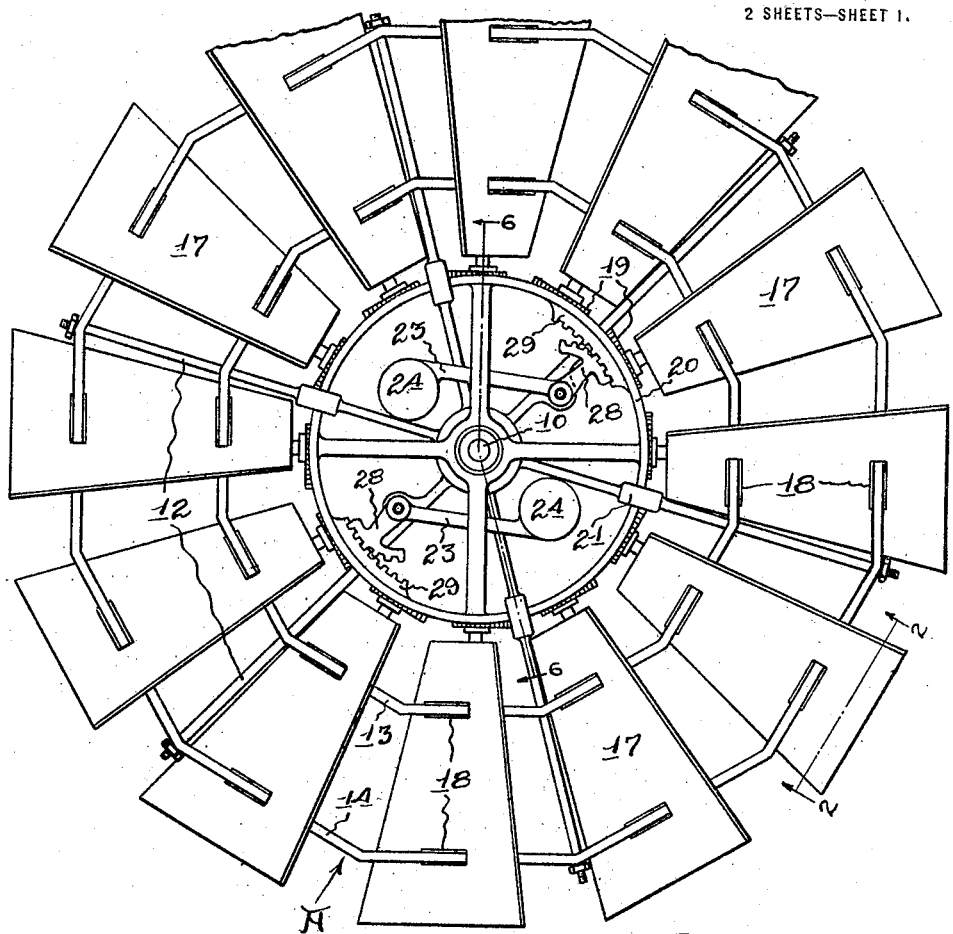
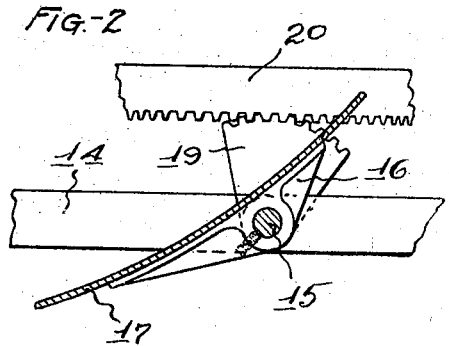
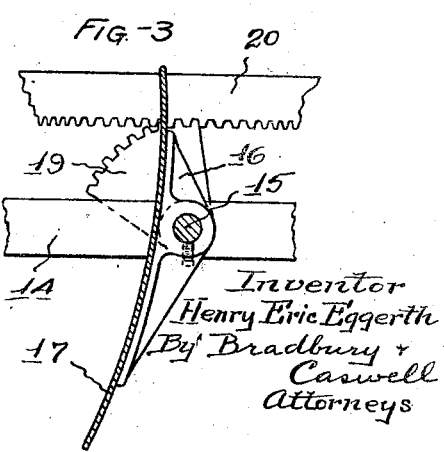

1,377,328.

Patented May 10, 1921.
2 SHEETS—SHEET 2.

Inventor
Henry Eric Eggerth
By Bradbury & Carwell
Attorneys.

UNITED STATES PATENT OFFICE.

HENRY ERIC EGGERTH, OF MINNEAPOLIS, MINNESOTA.

WINDMILL-FAN.

1,377,328.

Specification of Letters Patent.

Patented May 10, 1921.

Application filed January 12, 1920. Serial No. 350,905.

*To all whom it may concern:*

Be it known that I, HENRY ERIC EGGERTH, a subject of the King of Sweden, residing at Minneapolis, in the county of Hennepin and State of Minnesota, have invented a new and useful Windmill-Fan, of which the following is a specification.

My invention relates to improvements in wind mill fans.

Its object is to provide a simple, durable and compact device of this kind having a plurality of radial blades tiltable transversely and a governor operatively connected with said blades, said governor being adjustable and adapted to regulate the inclination of the blades, whereby desired uniform speeds of said fan may be obtained under variable operable wind pressures.

A further object is to provide a device of this kind, the blades thereof being mounted in such manner that pressure of the wind thereagainst is utilized in feathering said blades, thus relieving the governor mechanism of that work and requiring thereof only a regulating action in the adjustment of said blades in the event of increasing wind pressure.

With the foregoing and other objects in view, which will appear in the following description, the invention resides in the novel combination and arrangement of parts and in the details of construction hereinafter described and claimed.

Figure 4:
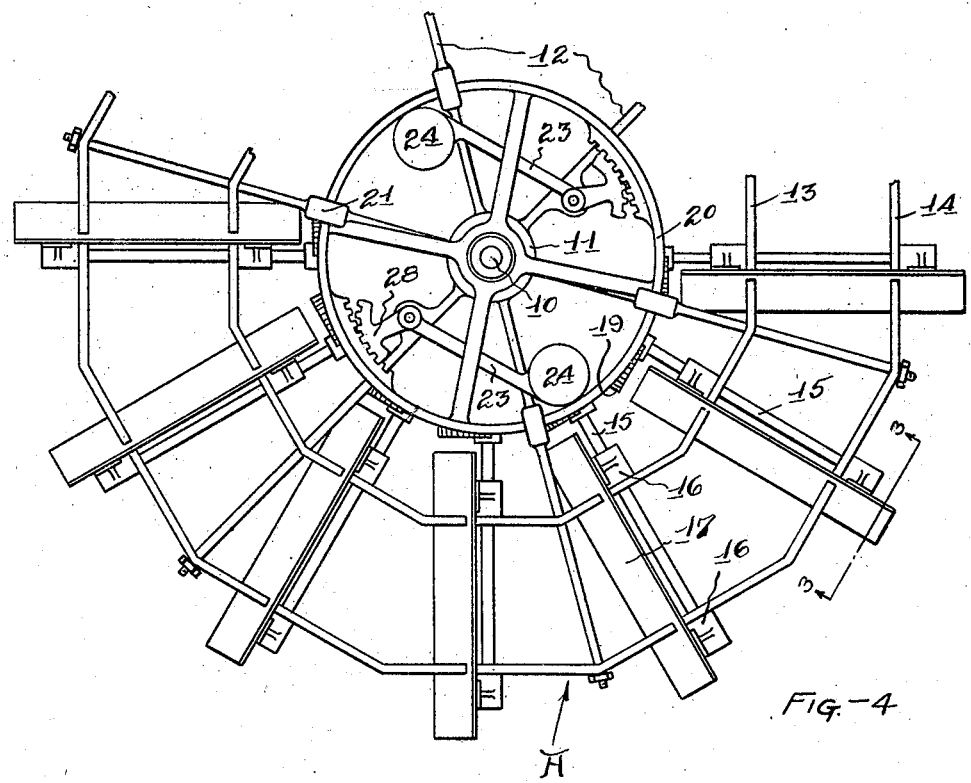
Figure 5:
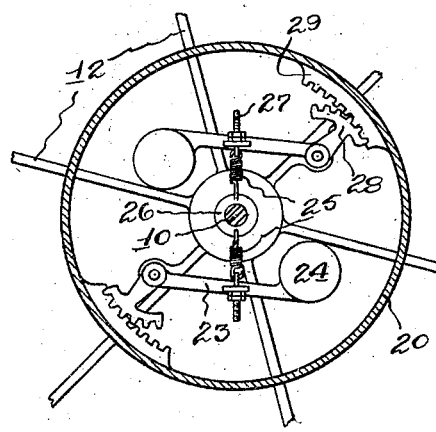
Figure 6:
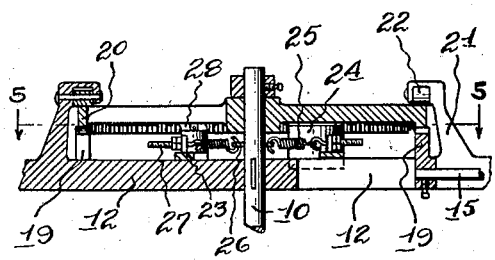

In the drawings, Figure 1 is a front elevation of my improved wind mill fan; Fig. 2 is a sectional view in detail, taken on the line 2—2 of Fig. 1; Fig. 3 is a similar view taken on the line 3—3 of Fig. 4; Fig. 4 is a front elevation of the fan, the blades therein being feathered; Fig. 5 is a sectional view taken on the line 5—5 of Fig. 6 and illustrates particularly the governor for the fan and Fig. 6 is a detail sectional view taken on the line 6—6 of Fig. 1.

Referring to the accompanying drawings, I have used the reference numeral 10 to indicate a wind mill fan shaft, which may be mounted horizontally in any suitable manner and directed into line with the wind or swung therefrom by any desired means. To such a shaft I apply my improved fan, which includes a frame A, comprising a bearing 11, spokes 12 projecting therefrom and inner and outer supporting members 13 and 14 carried by said spokes. The bearing 11 is keyed or otherwise suitably secured to the fan shaft 10. Radial rock shafts 15 mounted in the frame member 13 and 14 are each supplied with two or more adjustable brackets 16, which carry a fan blade 17. The fan blades 17 are formed with openings 18 near the ends thereof through which the frame members 13 and 14 pass, said openings being designed to permit the tilting of the blades from positions wherein the maximum driving power is obtainable (Figs. 1 and 2) to positions substantially edgewise with respect to the face of the fan (Figs. 3 and 4). The blades 17 are offset with respect to the shafts 15, so that pressure of the wind against said blades tends to swing the rear edges backward, or, in other words, feather the blades. Gear quadrants 19 secured to the inner ends of the rock shafts 15 mesh with a ring gear 20 loosely mounted upon the fan shaft 10. Hangers 21 on the spokes 12 of the frame A carry rollers 22, which bear upon the outer edge of the ring gear 20 and retain the same in mesh with said gear quadrants 19. Opposed governor arms 23 carrying weights 24 are pivoted upon spokes of the frame A on opposite sides of the fan shaft 10. Opposed springs 25 attached to a ring 26 upon the fan shaft 10 are adjustably connected through bolts 27 with the governor arms 23. Centrifugal force resulting from increased speeds of the fan, spreads these arms against the action of the springs 25. Said springs, however, operate to draw the governor arms together, as the speed of the fan decreases. Gear quadrants 28 on the pivoted ends of the governor arms 23 mesh with racks 29 on the ring gear 20.

In use, the governor controls the feathering action of the blades, caused by the pressure of the wind, as the velocity thereof increases. As the velocity of the wind decreases, the governor causes the blades 17 to tilt in the reverse directions. Thus, it will be seen that the inclination of the fan blades is regulated by the governor to maintain a predetermined speed in variable winds.

Changes in the specific form of my invention, as herein disclosed, may be made within the scope of what is claimed without departing from the spirit of my invention.

Having described my invention, what I claim as new and desire to protect by Letters Patent is:

1. In a device of the class described, the combination with a wind mill fan shaft, of a frame fixed to said shaft and revoluble therewith, rock shafts mounted radially in said frame, blades carried by said shafts, gear quadrants on the shafts, a ring gear loosely mounted on the fan shaft and meshing with said gear quadrants, racks on said ring gear, governor arms pivoted on the frame and a gear quadrant on each governor arm in mesh with one of the racks on the ring gear.

2. In a device of the class described, the combination with a wind mill fan shaft, of a frame fixed to said shaft and revoluble therewith, rock shafts mounted radially in the frame, a blade carried by each rock shaft and offset with respect thereto, gear quadrants on said shafts, a ring gear loosely mounted on the fan shaft and meshing with said gear quadrants, racks on said ring gear, governor arms pivoted on the frame and a gear quadrant on each governor arm in mesh with one of the racks on the ring gear.

3. In a device of the class described, the combination with a wind mill fan shaft, of a frame fixed to said shaft and revoluble therewith, said frame comprising a bearing with spokes thereon and inner and outer frame members carried by said spokes, rock shafts mounted radially in said frame members, blades formed with openings to receive said frame members and mounted on said rock shafts, gear quadrants on said shafts, a ring gear loosely mounted on the fan shaft and meshing with said gear quadrants and a governor carried by the frame and adapted to turn said ring gear and tilt said blades.

4. In a device of the class described, the combination with a wind mill fan shaft, of a frame fixed to said shaft and revoluble therewith, rock shafts mounted radially in said frame, blades carried by said rock shafts, gear quadrants on the rock shafts, a ring gear journaled on the fan shaft and meshing with said gear quadrants, a pair of opposed governor arms pivoted upon the frame on opposite sides of the fan shaft, springs having adjustable connections with said arms and adapted to yieldingly hold the same against outward movement, diametrically opposed racks on the ring gear and a gear quadrant on each governor arm in mesh with one of said racks.

In testimony whereof, I have signed my name to this specification.

HENRY ERIC EGGERTH.